United States Patent
Nam et al.

(10) Patent No.: US 11,353,885 B2
(45) Date of Patent: Jun. 7, 2022

(54) METHOD OF ACQUIRING IMAGE FOR RECOGNIZING POSITION AND ROBOT IMPLEMENTING THE SAME

(71) Applicant: LG ELECTRONICS INC., Seoul (KR)

(72) Inventors: Moonsik Nam, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 16/521,051

(22) Filed: Jul. 24, 2019

(65) Prior Publication Data
US 2019/0346850 A1   Nov. 14, 2019

(30) Foreign Application Priority Data

Jun. 24, 2019   (KR) ........................ 10-2019-0075093

(51) Int. Cl.
*G05D 1/02*   (2020.01)

(52) U.S. Cl.
CPC ........... *G05D 1/027* (2013.01); *G05D 1/0246* (2013.01); *G05D 2201/02* (2013.01)

(58) Field of Classification Search
None
See application file for complete search history.

(56) References Cited

U.S. PATENT DOCUMENTS

| | | | |
|---|---|---|---|
| 6,992,700 B1 * | 1/2006 | Sato | G03B 5/00 348/208.11 |
| 2002/0113865 A1 * | 8/2002 | Yano | H04N 13/239 348/47 |
| 2008/0030585 A1 * | 2/2008 | Grigorian | H04N 5/23299 348/208.4 |
| 2008/0055413 A1 * | 3/2008 | Hayashi | H04N 5/23296 348/169 |
| 2012/0212623 A1 | 8/2012 | Cho et al. | |
| 2014/0336848 A1 * | 11/2014 | Saund | G06T 7/215 701/3 |
| 2019/0208101 A1 * | 7/2019 | Gohl | H04N 5/23218 |
| 2019/0227566 A1 * | 7/2019 | Marutani | A47L 9/2852 |
| 2019/0315348 A1 * | 10/2019 | Mimura | G01C 21/3632 |
| 2019/0369241 A1 * | 12/2019 | Chen | G02B 7/287 |

FOREIGN PATENT DOCUMENTS

| | | |
|---|---|---|
| JP | 2008-162308 | 7/2008 |
| KR | 10-2012-0013513 | 2/2012 |
| KR | 10-2012-0098192 | 9/2012 |
| KR | 10-1400307 | 5/2014 |

OTHER PUBLICATIONS

Korean Office Action dated Aug. 26, 2020 issued in Application No. 10-2019-0075093.

* cited by examiner

*Primary Examiner* — Jeff A Burke
*Assistant Examiner* — Arslan Azhar
(74) *Attorney, Agent, or Firm* — Ked & Associates, LLP (57) ABSTRACT

Disclosed herein are a method of acquiring an image for recognizing a position and a robot implementing the same. In the method and robot, information value concerning movement of the robot is measured to efficiently acquire images including overlapped areas, and lenses of cameras on both sides of the robot are slided in a direction opposite to a direction of movement of the robot based on the measured information value concerning movement.

7 Claims, 10 Drawing Sheets

METHOD OF ACQUIRING IMAGE FOR RECOGNIZING POSITION AND ROBOT IMPLEMENTING THE SAME

CROSS-REFERENCE TO RELATED APPLICATION

This application claims priority to and the benefit of Korean Patent Application No. 10-2019-0075093, filed on Jun. 24, 2019, the disclosure of which is incorporated herein by reference in its entirety.

BACKGROUND

1. Field of the Invention

The present disclosure relates to a method of acquiring images for recognizing a position, and a robot implementing the same.

2. Description of Related Art

A moving robot may be driven in various ways. The moving robot may store a map concerning an entire space and may create a moving path on the map, or may create a path such that the robot senses surrounding obstacles without an additional map and avoids the sensed obstacles.

Specifically, a moving robot provided with a camera recognizes its position using images acquired through the camera. In this case, the moving robot has to acquire images which have overlapped areas to accurately recognize the position.

Figure 1:
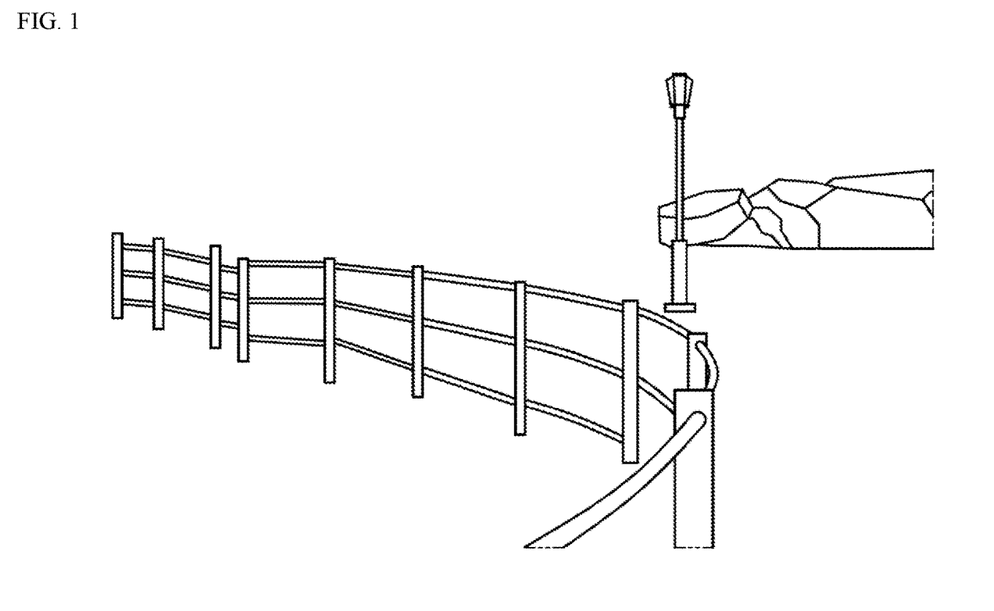
FIGS. 1 to 3 are views for explaining a concept of recognizing positions of a moving robot using images having overlapped areas.
Figure 2:
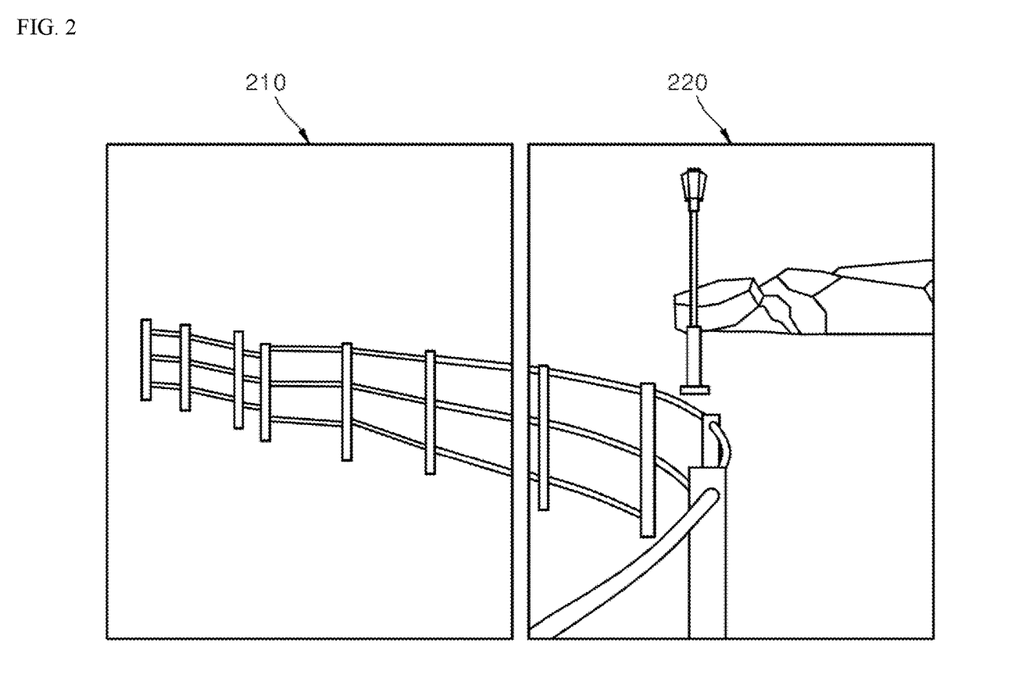
Figure 3:
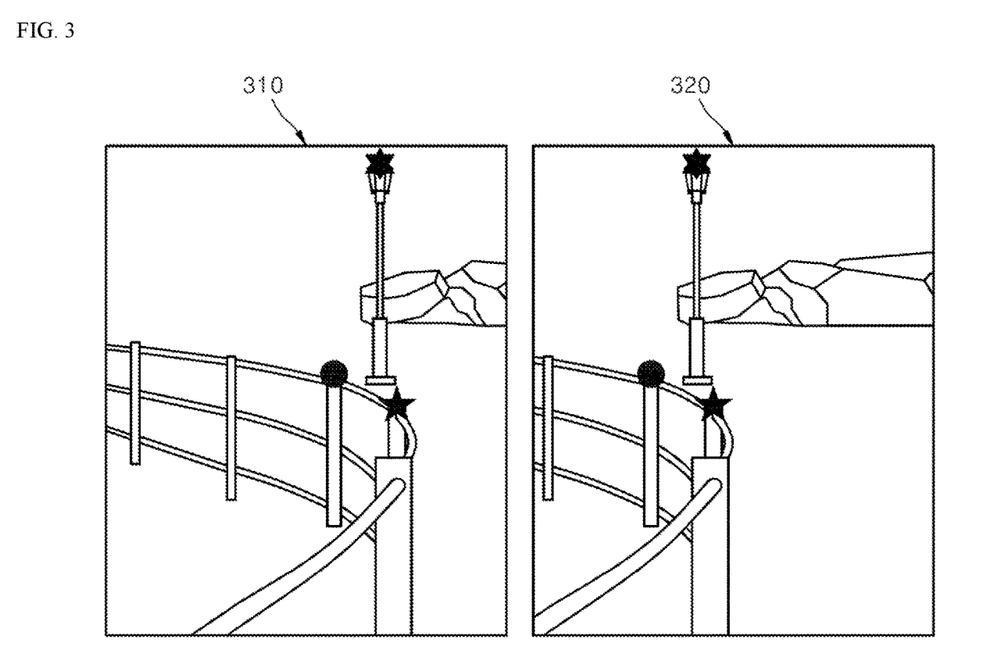

FIGS. 1 to 3 are views for explaining the concept of recognizing positions of a moving robot using images that include overlapped areas.

FIG. 1 illustrates a single image concerning a specific scene, FIG. 2 illustrates two images that do not include overlapped areas concerning the specific scene, and FIG. 3 illustrates two images that include overlapped areas concerning the specific scene.

Referring to FIG. 2, the fence, rocks and the like in the two images 210, 220 lead a person to infer that the two images 210, 220 are acquired at the same point.

However, the moving robot may not infer a connection between the two images 210, 220. That is, the moving robot may recognize its position based on relative information between objects. However, the moving robot may not recognize its position because relative information between objects is not included in the two images 210, 220.

Referring to FIG. 3, relative information between objects is included in the two images 310, 320. The moving robot sets a landmark concerning each of the two images 310, 320, figures out a corelationship between the set landmarks, and determines that the two images 310, 320 were acquired at the same point. By doing so, the moving robot may recognize its position.

As illustrated in FIG. 2, there are times when the moving robot acquires only images that do not have overlapped areas in the case in which the moving robot moves at high speeds. In this case, the moving robot may not accurately measure its position.

SUMMARY OF THE INVENTION

One objective of the present disclosure is to provide a method of efficiently acquiring images that include overlapped areas for recognizing the position of a robot, and a robot implementing the same.

Another objective of the present disclosure is to provide a method of acquiring images for accurately recognizing the position of a robot even when the robot is driven at high speeds and a robot implementing the same.

The objectives of the present disclosure should not be limited to what has been mentioned. Additionally, other objectives and advantages that have not been mentioned may be clearly understood from the following description and more clearly understood from embodiments. Further, it will be apparent that the objectives and advantages of the present disclosure may be implemented through means and a combination thereof in the appended claims.

As a means to solve the above-described problems, a robot according to a first embodiment includes a body that moves in any one of the forward direction and the rearward direction, one or more cameras that are disposed on at least one of both lateral sides of the body and that includes a lens which slidably moves, and an inertial measurement unit (IMU) sensor that measures information value concerning movement of the moving body, wherein sliding movement of the lens is controlled based on the measured information value concerning movement of the body.

A robot according to a second embodiment includes a body that moves in any one of the forward direction and the rearward direction, one or more rotating cameras that are stacked and disposed on the upper surface of the body and that include a lens which may rotate, and an IMU sensor that measures information value concerning movement of the moving body, wherein a direction of the rotation of the lens of each of one or more rotating cameras is controlled based on the measured information value concerning movement of the body.

A method of acquiring images for recognizing the position of a robot according to an embodiment includes measuring information value concerning movement of a robot that moves in any one of the forward direction and the rearward direction by an IMU sensor, and sliding a lens of each of one or more cameras that are disposed on at least one of both lateral sides of the robot based on the measured information value concerning movement by a processing unit.

According to the present disclosure, images that include overlapped areas for recognizing the position of a robot may be efficiently acquired.

According to the present disclosure, the position of a robot even when the robot is driven at high speeds may be accurately recognized.

Effects of the present disclosure are not limited to what has been described above, and one skilled in the art may readily draw various effects from configurations of the disclosure.

DETAILED DESCRIPTION OF THE INVENTION

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot may generally denote a device that performs specific functions and moves in specific areas. Functions performed by robots include various ones such as cleaning, methods, guides, drawing up maps, delivery and the like that may be provided by moving devices.

Figure 4:
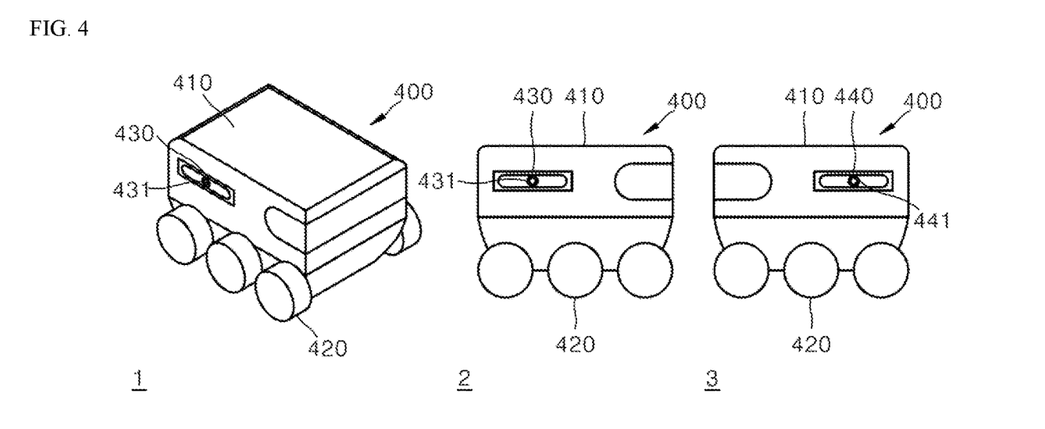
FIG. 4 is a view illustrating a shape of a robot according to a first embodiment.

Referring to FIG. 4, the robot 400 according to a first embodiment may be a delivery robot, and a first shape 1 of FIG. 4 illustrates a perspective view of the robot 400, a second shape 2 illustrates a left side view of the robot 400, and a third shape 3 illustrates a right side view of the robot 400.

Referring to FIG. 4, the robot 400 includes a body 410, a moving unit 420, a first camera 430 and a second camera 440.

The body 410 forms an appearance of the robot 400 and stores other components of the robot 400 therein. In general, the body 410 has a cube shape and includes the moving unit 420 in the lower portion of the cube. However, the shape of the body 410 is not limited.

The moving unit 420 moves the body 410, and the robot 400 may move in any one of the forward direction and the rearward direction.

In this case, a "movement in the forward direction" denotes a straight linear movement in the forward direction as well as a leftward movement and a rightward movement with respect to the front side.

Likewise, a "movement in the rearward direction" denotes a straight linear movement in the rearward direction as well as a leftward movement and a rightward movement with respect to the rear side.

The robot 400 moves with respect to the forward direction except specific cases. Accordingly, in this specification, embodiments are described with respect to the forward direction. However, what is described below may also be applied to a movement of the robot 400 in the rearward direction.

The first camera 430 is disposed on the right side of the body 410 of the robot 400, and acquires images in the rightward direction of the robot 400 that is moving in the forward direction. The second camera 440 is disposed on the left side of the body 410 of the robot 400, and acquires images in the leftward direction of the robot 400 that is moving in the forward direction. The robot 400 recognizes the position thereof based on images acquired by the first camera 430 from the right side of the robot 400 and based on images acquired by the second camera 440 from the left side of the robot 400.

The first camera 430 and the second camera 440 may have the same shape and structure. In this case, as described below, lenses 431, 441 included in each of the first camera 430 and the second camera 440 may slidably move. The shape and structure of the first camera 430 and the second camera 440 are specifically described hereunder.

Additionally, FIG. 4 illustrates a body 410 with cameras 430, 440 on all the right and left sides thereof, as an example. However, the body 410 may include the first camera 430 only on the right side thereof or may include the second camera 440 only on the left side thereof. That is, one or more cameras may be disposed on at least one of both lateral sides of the body.

Though not illustrated in FIG. 4, a third camera for a movement of the robot 400 may be disposed at the front side of the body 410.

Figure 5:
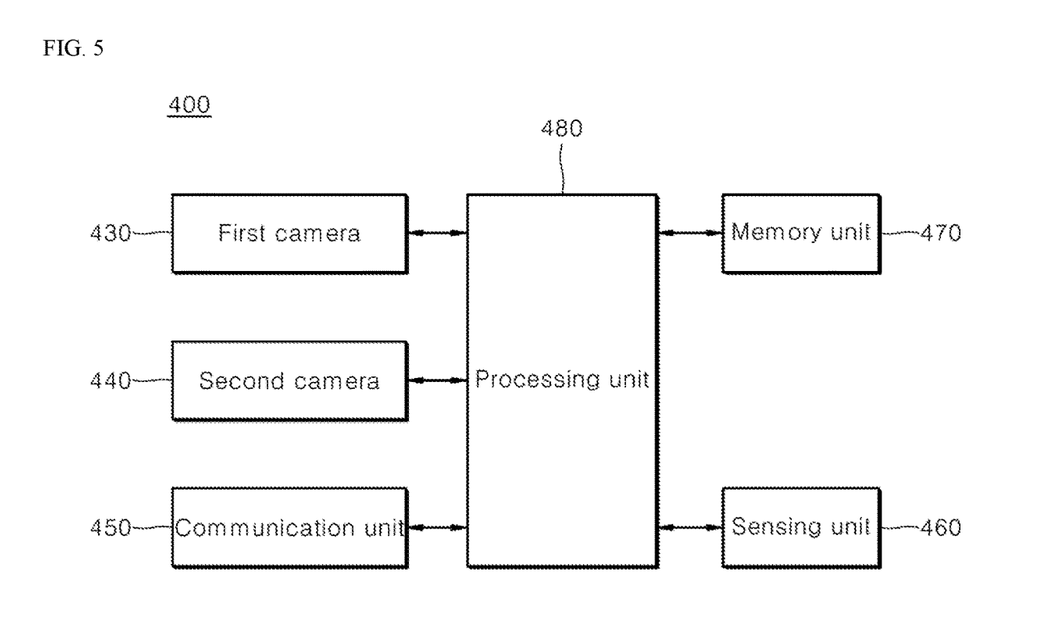
FIG. 5 is a view illustrating a control relationship between major components of the robot according to the first embodiment.

FIG. 5 is a view illustrating a control relationship between major components of the robot 400 according to the first embodiment.

Referring to FIG. 5, the robot 400 includes a communication unit 450, a sensing unit 460, a memory unit 470 and a processing unit 480 in addition to the moving unit 420, the first camera 430, and the second camera 440 that are described above.

The communication unit 450 communicates with external management servers and the like. For example, the communication unit 450 uses communication technologies such as Global System for Mobile (GSM) communications, Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC) and the like.

The sensing unit 460 acquires internal information of the robot 400, information on the surroundings of the robot 400 and the like, using various sensors. For example, sensors in the sensing unit 460 include an inertial measurement unit (IMU) sensor, a proximity sensor, an illuminance sensor, an RGB sensor, an IR sensor, an ultrasonic sensor, a photosensor, a lidar sensor, a radar and the like. The IMU sensor measures information on movements of the moving robot 400 and includes an acceleration sensor, a magnetic sensor, a gyro sensor, an inertial sensor and the like.

The memory unit 470 may be volatile and/or non-volatile memory, and stores instructions or data concerning the control of at least one of the other components of the robot 400, and stores a plurality of application programs or applications that are driven in the robot 400. Specifically, the memory unit 470 may store images acquired by the first camera 430 and the second camera 440 and stores other data concerning the first camera 430 and the second camera 440.

The processing unit 480 may include one or more of a central processing unit, an application processing unit, or a communication processing unit. The processing unit 480 controls operations of the robot 400 as a whole and processes input or output signals, data, information and the like, or drives the application programs stored in the memory unit 470. For example, the processing unit 480 controls the moving unit 420, and controls the acquisition of an image by the first camera 430 and the second camera 440, and the slidable movement of the lenses 431, and 441.

Below, the first camera 430 and the second camera 440 according to the first embodiment are specifically described with reference to FIG. 6. In this case, the first camera 430 and the second camera 440 have the same shape. Accordingly, the cameras 430, 440 are described based on the first camera 430 for convenience of description.

Figure 6:
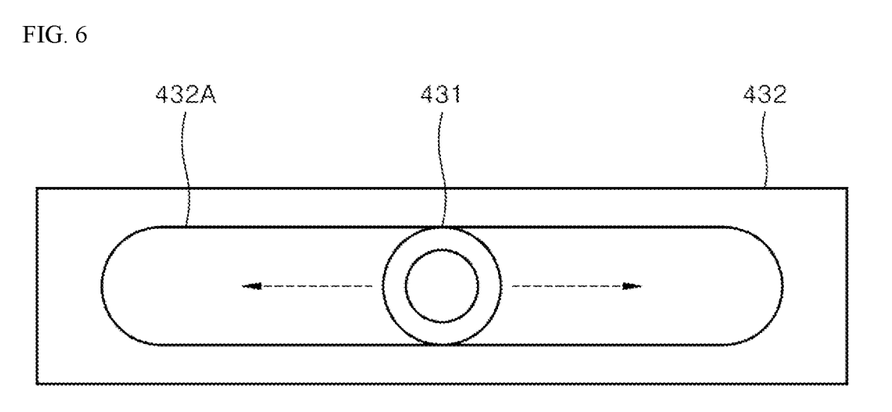
FIG. 6 is a view illustrating a shape of a first camera according to the first embodiment.

FIG. 6 is a view illustrating a shape of the first camera 430 according to the first embodiment.

Referring to FIG. 6, the first camera 430 includes a lens 431 and a case 432, and though not illustrated in FIG. 6, further includes a motor, a connection portion and a tracking unit. The motor, the connection portion and the tracking unit are disposed near the case 432.

The lens 431 is a key component of the first camera 430 for acquiring an image and may slidably move.

A sliding guide unit 432A is formed in the case 432, i.e., the central portion of the case 432, and the lens 431 slidably moves in the sliding guide unit 432A. In this case, the case 432 corresponds to a gimbal.

For example, the lens 431 is disposed at a preset initial position in the sliding guide unit 432A, and in a specific case that is described below, the lens 431 moves in any one of the left direction and the right direction.

In this case, the initial position may be the center of the sliding guide unit 432A, or may be one end of both ends of the sliding guide unit 432A. For example, when the robot 400 moves in the forward direction, the initial position may be the end of both ends of the sliding guide unit 432A, which is placed in the forward direction.

The motor supplies power for moving the lens 431. Additionally, the connection portion delivers the power generated by the motor to the lens 431.

That is, the slidable movement of the lens 431 may be performed using the motor. The operation of the motor is controlled through an instruction for operating the motor, which is created by the processing unit 480, and the instruction for operating the motor may be created based on information value concerning the movement of the robot 400, which is measured by the IMU sensor.

According to the present disclosure, when the robot 400 moves in the forward direction, the sliding movement of the lens 431 may be controlled based on information value concerning the movement of the moving robot 400, which is measured by the IMU sensor in the sensing unit 460. That is, the sliding movement of the lens 431 may be controlled based on information on movements such as acceleration, angular velocity and the like of the robot 400.

According to an embodiment, when information value on the movement of the robot 400 exceed a preset threshold value in the case in which the robot 400 moves in one direction, the lens 431 may be controlled to slidably move in a direction opposite to one direction.

Specifically, when the robot 400 performs a straight linear movement in the forward direction, information value concerning movement may include acceleration value, and when acceleration value of the robot 400 is greater than or equal to a preset threshold value, the lens 431 may be controlled to slidably move in a direction opposite to the forward direction, i.e., the rearward direction.

More specifically, in a conventional robot including a camera provided with a lens that does not slidably move, when the conventional robot moves at low speeds, the camera of the conventional robot may acquire images including overlapped areas, in a way similar to what is described in FIG. 3.

However, when the conventional robot moves at high speeds, the camera of the conventional robot may not acquire images including overlapped areas, in a way similar to what is described in FIG. 2, due to mechanical limitations and the like of the camera. Accordingly, the conventional robot may not accurately recognize its current position because images including overlapped areas are not acquired.

However, in the robot 400 of the present disclosure, when acceleration of the robot 400 moving in the forward direction is greater than or equal to a preset threshold value, the processing unit 480 may slidably move the lens 431 disposed at the initial position in the rearward direction that is a direction opposite to the forward direction.

In this case, a first image is acquired by the lens 431 at the initial position, and a second image is acquired by the lens 431 at the position in which the lens is slided. The first image corresponds to the image 310 illustrated in FIG. 3, and the second image corresponds to the image 320 illustrated in FIG. 3. That is, the first image and the second image are images having overlapped areas. Additionally, images that are acquired by the lens 431 in real time are stored in the memory unit 470. Accordingly, the processing unit 480 of the robot 400 may recognize the position of the robot 400 based on the first image and the second image that are stored in the memory unit 470.

The tracking unit tracks the position of the lens 431 at the time of acquisition of images. In this case, the processing unit 480 may calculate an extrinsic parameter of the lens 431 at the time of acquisition of images using the tracked position of the lens 431, and the acquired images and the extrinsic parameter corresponding to the acquired images may be matched and stored in the memory unit 470. The extrinsic parameter is information such as the position, height, posture and the like of the camera, or the lens 431 at the time of acquisition of images. Accordingly, the processing unit 480 may effectively search for images having overlapped areas based on the above-described matching relationship.

Additionally, acceleration value of the robot 400 moving in the forward direction may be proportional to a distance value of sliding movement of the lens 431. That is, when acceleration value of the robot 400 become greater, the lens 431 may slide further. This is to acquire images having an overlapped area more efficiently, as described above. In other words, when acceleration value of the robot 400 become greater, the robot 400 moves farther for unit time. Accordingly, the lens 431 also has to slide farther. As a result, images having overlapped areas are acquired.

Additionally, when acceleration value measured by the IMU sensor is included in a preset section of normal states, the lens 431 may be controlled to return to the initial position. For example, in the case in which normal state section is a section with zero acceleration (constant velocity section), images including overlapped areas may be acquired even though the lens 431 does not slide. Accordingly, the processing unit 480 may control the lens 431 such that the lens 480 may return to the initial position.

Below, the operation of acquiring images by the first camera 430 and the second camera 440 in the case in which the robot 400 moves is specifically described with reference to FIG. 7.

Figure 7:
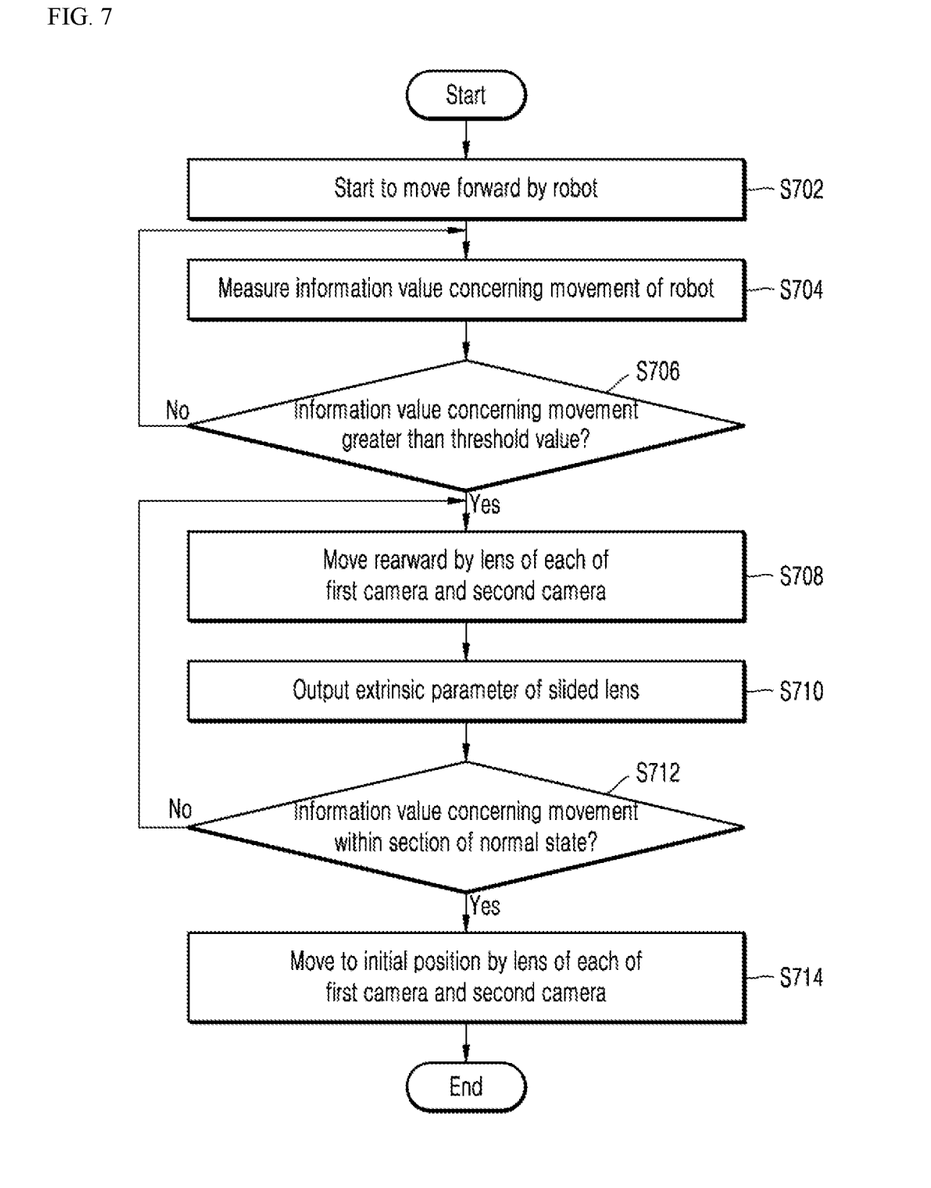
FIG. 7 is a flow chart illustrating a method of acquiring images for recognizing a position of a robot according to an embodiment.
Figure 8:
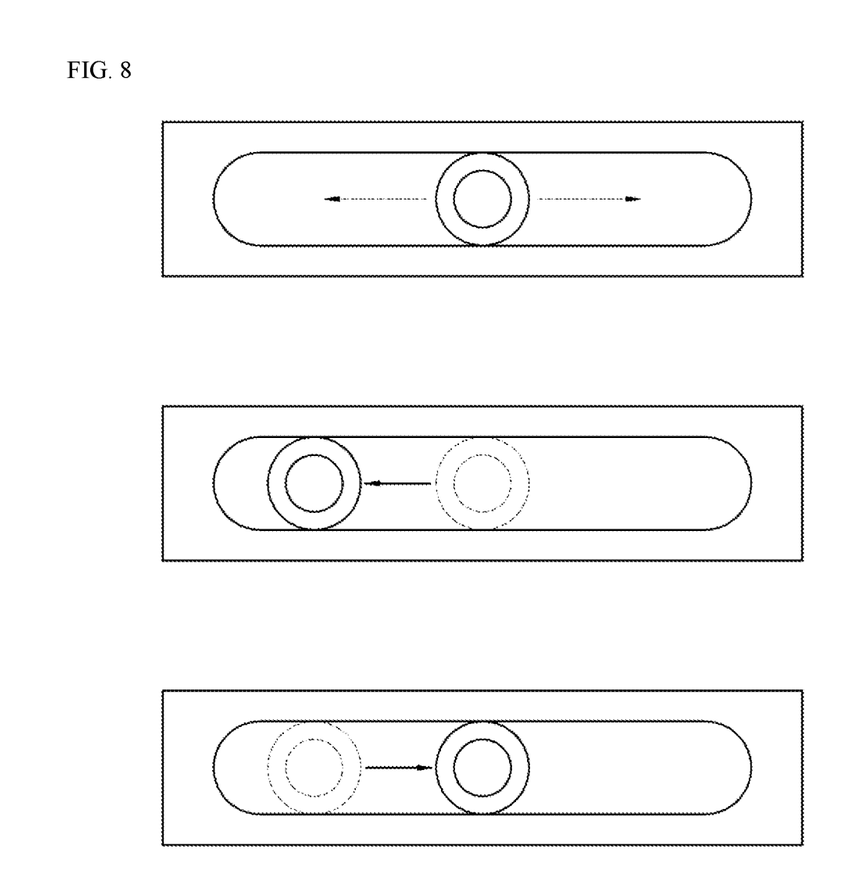
FIG. 8 is a view for explaining a movement of a lens of the first camera according to the first embodiment.

FIG. 7 is a flow chart illustrating a method of acquiring images for recognizing a position of the robot according to an embodiment. In this case, suppose that the lens 431, 441 of each of the first camera 430 and the second camera 440, as illustrated in the upper end of FIG. 8, is disposed at the initial position in the sliding guide unit. Operations performed in each step are described as follows.

First, the robot 400 starts to move in the forward direction (S702), and the IMU sensor measures information value concerning movement of the robot 400 (S704). The measured information value concerning movement is delivered to the processing unit 480.

The processing unit 480 determines whether the measured information value concerning movement is greater than or equal to a preset threshold value (S706).

When information value concerning movement is less than a threshold value, step 704 is performed. Conversely, when information value concerning movement is greater than or equal to a threshold value, the processing unit 480 controls the lens 431, 441 of each of the first camera 430 and the second camera 440 such that the lens 431, 441 may move in the rearward direction (S708), as illustrated in the middle part of FIG. 8.

According to an embodiment, the processing unit 480 may control distances slid by the lenses 431, 441 such that information value concerning movement of the robot 400 moving in the forward direction is proportional to distances slid by the lenses 431, 441.

Additionally, the processing unit 480 calculates extrinsic parameter of the slided lenses 431, 441 (S710). The calculated extrinsic parameter is matched with acquired images and stored in the memory unit 470.

The processing unit 480 determines whether the measured information value concerning movement is in a section of normal states (S712). In this case, the section of normal states may include a section of uniform motions without acceleration of the robot 400.

When information value concerning movement is not in the section of normal states, step 708 and step 710 are performed. Conversely, when information value concerning movement is in the section of normal states, the processing unit 480 controls the lens 431, 441 of each of the first camera 430 and the second camera 440 such that the lens 431, 441 moves to the initial position, as illustrated in the lower end of FIG. 8.

In summary, the robot 400 of the present disclosure may effectively acquire images including overlapped areas, and accordingly, may accurately recognize its position.

Figure 9:
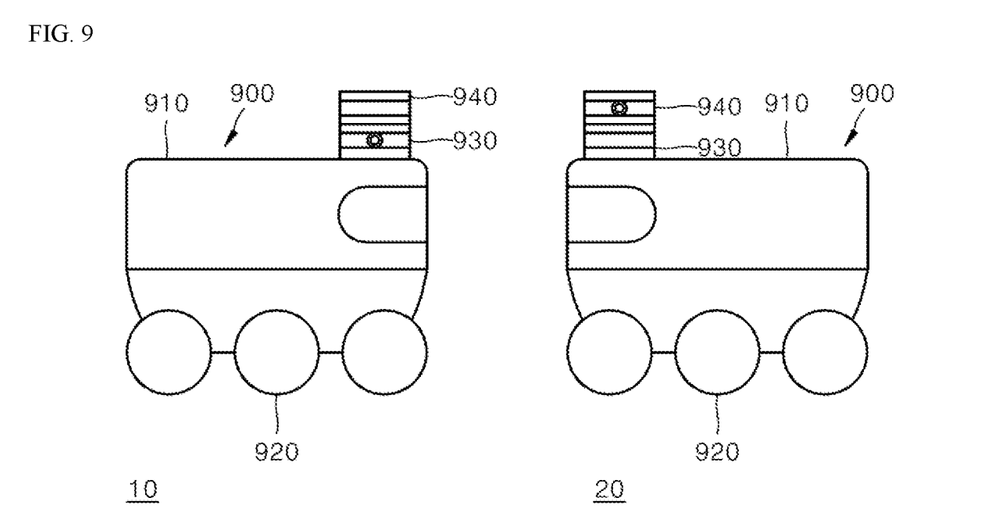
FIG. 9 is a view illustrating a shape of a robot according to a second embodiment.

FIG. 9 is a view illustrating a shape of a robot according to a second embodiment.

Referring to FIG. 9, the configuration of the robot 900 according to the second embodiment is the same as that of the robot 400 according to the first embodiment except the first camera 930 and the second camera 940. Below, the robot 900 is described in relation to the first camera 930 and the second camera 940 for convenience of description.

The first camera 930 and the second camera 940 are rotation-type cameras and are stacked. That is, the first camera 930 is disposed on the upper surface of the body 910, and the second camera 940 is disposed on the upper surface of the first camera 930. Additionally, the first camera 930 and the second camera 940 have the same shape and perform the same operations.

In this case, the first camera 930 acquires images in the direction of the right side of the robot 900, and the second camera 940 acquires images in the direction of the left side of the robot 900. Below, the first camera 430 and the second camera 440 according to the first embodiment are more specifically described with reference to FIG. 6. In this case, the first camera 430 and the second camera 440 have the same shape. Accordingly, the cameras 430, 440 are described based on the first camera 430 for convenience of description.

Figure 10:
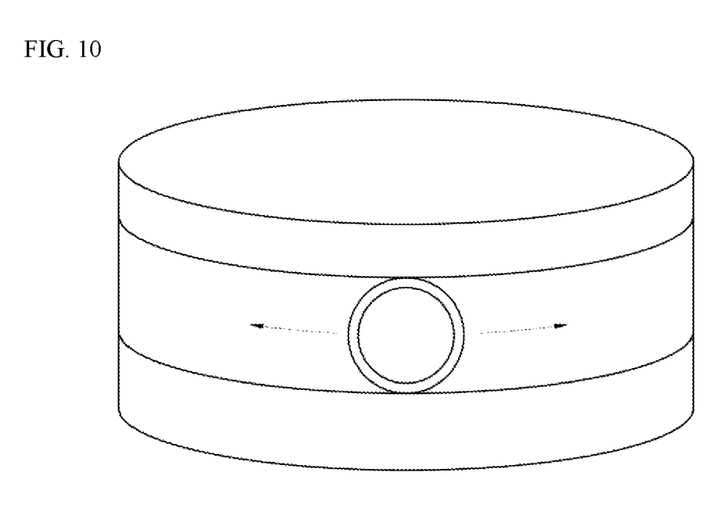
FIG. 10 is a view illustrating a shape of a first camera according to the second embodiment.

FIG. 10 is a view illustrating a shape of the first camera 930 according to the second embodiment. What is described hereunder is also applied to the second camera 940.

Referring to FIG. 10, the first camera 930 includes a lens 931 and a case 932, and though not illustrated in FIG. 9, further includes a motor, a connection portion and a tracking unit. The motor, the connection portion and the tracking unit are disposed near the case 432.

The lens 931 acquires images and may rotate.

A rotation guide unit 932A is formed inside the case 932, and the lens 931 rotates inside the rotation guide unit 932A.

For example, the lens 931 is disposed at a preset initial position in the rotation guide unit 932A. In a specific case, the lens 931 moves in any one of the clockwise direction and the counterclockwise direction.

In this case, the initial position may be a position inside the rotation guide unit 932A that is perpendicular to the right side of the robot 900.

The motor supplies power for moving the lens 931, and the connection portion delivers the power generated by the motor to the lens 931.

According to an embodiment, when information value concerning movement of the robot 900 are greater than or equal to a preset threshold value in the case in which the robot 900 moves in the forward direction, the lens 931 of the first camera 930 may be controlled to rotate in a direction opposite to the forward direction. In relation to this, the first camera 930 is similar to the first camera 430 according to the first embodiment. Accordingly, detailed description concerning this is avoided.

Additionally, the embodiments of the present disclosure may be implemented in the form of a program instruction that may be performed through various computer means, and may be recorded in computer-readable media. The computer-readable media may comprise program instructions, data files, data structures and the like independently, or a combination thereof. The program instructions recorded on the media may be specially designed and configured for the present invention or the program instructions that are publicly known to those skilled in the art relating to computer software programs may be used. The examples of computer-readable media include magnetic media such as hard disks, floppy disks and magnetic tape, optical media such as CD-ROMs and DVDs, magneto-optical media such as floptical disks, and hardware devices that are specially configured to store and perform the program instructions such as Read Only Memory (ROM), Random Access Memory (RAM), flash memory and the like. The examples of program instructions include machine language code produced by a compiler as well as high-level language code executed by the computer using an interpreter and the like. The hardware devices described above may be configured to operate as one or more software modules for performing operations of the embodiments of the present invention, and vice versa.

The present disclosure has been described with reference to specific details such as specific components and the like, limited embodiments, and drawings. However, the details, embodiments and drawing are provided only as examples such that the disclosure may be better understood. Further, the present disclosure is not limited to the above-described embodiments and may be modified and changed by one having ordinary skill in the art to which the disclosure pertains from the embodiments. Thus, the technical spirit of the present disclosure should not be construed as being limited to the embodiments set forth herein. Rather, the embodiments are intended to cover various modifications and equivalents within the spirit and scope of the appended claims.

[Description of the Symbols]

| 400, 900: Robot | 410, 910: Body |
|---|---|
| 420, 920: Moving unit | 430, 930: First camera |
| 440, 940: Second camera | |

What is claimed is:

1. A robot, comprising:
a body configured to move in one direction of a forward direction or a rearward direction;
an inertial measurement unit (IMU) sensor configured to measure an acceleration value of the body;
one or more cameras disposed on at least one of both lateral sides of the body, wherein each of the one or more cameras includes a case and a lens that slidably moves inside the case, and wherein, when the acceleration value of the body is greater than or equal to a preset threshold value and the lens is fixedly disposed at a specific position in the case, images A and B acquired continuously from the lens do not include an overlapped area; and
a processor configured to slidably move the lens based on the acceleration value of the body and recognize a position of the robot based on images sequentially acquired from the lens,
wherein the lens acquires a first image at a first time point and a second image at a second time point, and the second time point is a time point immediately after the first time point,
wherein the lens is initially disposed in a first position inside the case that is a preset initial position,
the lens slidably moves to be disposed in a second position inside the case, and the first position is positioned further in the one direction than the second position,
wherein, in a first situation in which the acceleration value of the main body is less than the threshold value, the lens is disposed in the first position at both the first time point and the second time point, and acquires the first image and the second image at the first position,
wherein, in a second situation in which the acceleration value of the main body is greater than or equal to the threshold value, the lens is disposed in the first position at the first time point and in the second position at the second time point, and acquires the first image at the first position and the second position at the second position,
wherein, in the first situation and the second situation, the first image and the second image include the overlapped area,
wherein the lens returns to the first position while the robot continues to move in the one direction and when the acceleration value of the main body is less than the threshold value, and a third image that includes the overlapped area is captured after the lens returns to the first position, and
wherein the processor is configured to recognize the position of the robot based on the overlapped area.

2. The robot of claim 1, wherein the acceleration value of the body is proportional to a distance value of a sliding movement of the lens.

3. The robot of claim 1, wherein each of the one or more cameras further includes a motor for moving the lens, and a connection portion configured to deliver power generated by the motor to the lens, and
wherein operation of the motor is controlled based on the acceleration value of the body.

4. The robot of claim 1, wherein each of the one or more cameras further includes a tracking sensor configured to track positions of the lens inside the sliding guide unit.

5. A method of acquiring an image for recognizing positions of a robot, wherein the robot includes camera being disposed on lateral side of the robot and having a case and a lens that slidably moves inside the case, an inertial measurement unit (IMU) sensor measuring an acceleration value of the robot and processor, and wherein, when the acceleration value of the robot is greater than or equal to a preset threshold value and the lens is fixedly disposed at a specific position in the case, images A and B acquired continuously from the lens do not include an overlapped area, the method comprising:
measuring, by the IMU sensor, the acceleration value of the robot moving in one direction of a forward direction or a rearward direction; and
controlling, by the processor, the lens to slidably move based on the acceleration value and recognizing a position of the robot based on images sequentially acquired from the lens,
wherein the lens acquires a first image at a first time point and a second image at a second time point, and the second time point is a time point immediately after the first time point,
wherein the lens is initially disposed in a first position that is a preset initial position,
wherein the lens slidably moves to be disposed in a second position inside the case, and the first position is positioned further in the one direction than the second position,
wherein, in a first situation in which the acceleration value of the main body is less than the threshold value, the lens is disposed in the first position at both the first time point and the second time point, and acquires the first image and the second image at the first position, wherein, in a second situation in which the acceleration value of the main body is greater than or equal to the threshold value, the lens is disposed in the first position at the first time point and in the second position at the second time point, and acquires the first image at the first position and the second image at the second position, wherein, in the first situation and the second situation, the first image and the second image include the overlapped area, wherein the lens returns to the first position while the robot continues to move in the one direction and when the acceleration value of the main body is less than the threshold value, and a third image that includes the overlapped area is captured after the lens returns to the first position, and wherein the position of the robot is recognized based on the overlapped area.

6. The method of claim 5, wherein a distance of a sliding movement of the lens is proportional to the acceleration value.

7. The method of claim 5, wherein each of the one or more cameras further includes a motor for moving the lens, and a connection portion configured to deliver power generated by the motor to the lens, wherein the method further comprising controlling operation of the motor based on the acceleration value.

* * * * *